US008832340B2

(12) United States Patent
Miyachi et al.

(10) Patent No.: US 8,832,340 B2
(45) Date of Patent: Sep. 9, 2014

(54) SYSTEM AND METHOD FOR ENABLING NETWORK ACCESS TO MASS STORAGE DEVICES CONNECTED TO MULTI-FUNCTION DEVICES

(75) Inventors: Christine Mary Miyachi, Andover, MA (US); Chandra Sekhar Varma Dasaraju, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/016,309

(22) Filed: Jan. 28, 2011

(65) Prior Publication Data

US 2012/0198104 A1    Aug. 2, 2012

(51) Int. Cl.
G06F 13/12    (2006.01)
G06F 13/00    (2006.01)
H04L 29/08    (2006.01)

(52) U.S. Cl.
CPC ............... *G06F 13/00* (2013.01); *H04L 67/18* (2013.01)
USPC ........................................................ 710/62

(58) Field of Classification Search
USPC .......... 710/3, 5, 8, 13, 20, 36, 62; 711/1, 100, 711/101, 147
See application file for complete search history.

(56) References Cited

U.S. PATENT DOCUMENTS

| | | | |
|---|---|---|---|
| 6,980,312 B1 * | 12/2005 | Czyszczewski et al. ...... | 358/1.15 |
| 7,096,143 B2 * | 8/2006 | Ternasky et al. ............... | 702/123 |
| 7,676,491 B2 * | 3/2010 | Jansen et al. ............ | 707/999.102 |
| 7,679,761 B2 * | 3/2010 | Kato ............................. | 358/1.15 |
| 7,685,223 B1 * | 3/2010 | Basavaiah et al. ............ | 709/200 |
| 7,689,824 B2 * | 3/2010 | Imaizumi et al. ............. | 713/169 |
| 7,693,990 B2 * | 4/2010 | Tsujimoto ...................... | 709/225 |
| 7,707,414 B2 * | 4/2010 | Nishio ........................... | 713/168 |
| 7,725,731 B2 * | 5/2010 | Brown et al. .................. | 713/183 |
| 7,784,087 B2 * | 8/2010 | Yami et al. ......................... | 726/4 |
| 7,904,609 B2 * | 3/2011 | Uno ................................. | 710/14 |
| 8,037,191 B2 * | 10/2011 | Lin et al. ........................ | 709/227 |
| 2005/0111866 A1 | 5/2005 | Sato | |
| 2006/0046691 A1 | 3/2006 | Nishio | |
| 2007/0033540 A1 | 2/2007 | Bridges et al. | |
| 2007/0107042 A1 | 5/2007 | Corona | |
| 2007/0168576 A1 | 7/2007 | Rosenbloom et al. | |
| 2008/0022087 A1 * | 1/2008 | Tsujimoto ...................... | 713/155 |
| 2008/0091800 A1 * | 4/2008 | Sorrentino et al. ........... | 709/219 |
| 2008/0174821 A1 | 7/2008 | Singh et al. | |
| 2009/0125537 A1 * | 5/2009 | Susi et al. ...................... | 707/101 |
| 2011/0240736 A1 * | 10/2011 | Miyachi et al. ................ | 235/382 |
| 2011/0242580 A1 | 10/2011 | Tran | |

* cited by examiner

FOREIGN PATENT DOCUMENTS

WO    WO 2009/126212 A1    10/2009

OTHER PUBLICATIONS

GB Search Report for GB1201026.0 dated May 16, 2012.

*Primary Examiner* — Idriss N Alrobaye
*Assistant Examiner* — Richard B Franklin
(74) *Attorney, Agent, or Firm* — Luis M. Ortiz; Kermit D. Lopez; Kevin Soules

(57) ABSTRACT

A system for enabling at least one mass storage device connected to at least one multi-function device to be accessible over a network, includes at least one processor; and a computer-readable storage medium in communication with the at least one processor, wherein the computer-readable storage medium comprises one or more programming instructions for receiving a plurality of requests from one or more electronic devices permitted to access the at least one multi-function device and allowing the one or more electronic devices to selectively access and modify electronic information located on the at least one mass storage device connected to the at least one multi-function device and accessible over the network.

18 Claims, 4 Drawing Sheets

SYSTEM AND METHOD FOR ENABLING NETWORK ACCESS TO MASS STORAGE DEVICES CONNECTED TO MULTI-FUNCTION DEVICES

BACKGROUND

1. Field of Related Art

The present disclosure is generally related to multi-function devices, and more particularly, to a system and method for enabling at least one mass storage device connected to at least one multi-function device to be accessible over a network.

2. Description of Related Art

"Multi-function" machines or multifunction devices (MFDs) have become familiar in offices and in home computing environments. Whereas, previously, functions such as copying, printing, and facsimile transmission have been performed by single dedicated copiers, printers, and facsimiles respectively, a multi-function machine is typically capable of providing all such functions and more in a single machine. Typically, such a multi-function machine includes a single print engine, which may serve to output copies, prints, or received facsimiles; as well as a single input scanner which may serve to record data from original images for use in copying, facsimile transmission, and retention of input image data to a predetermined location in a computer memory.

MFDs typically have the necessary hardware, such as a Local Area Network (LAN) card, and software, such as a network operating system, to enable network accessibility. MFDs also typically have ports, such as Universal Serial Bus (USB) ports, or interfaces, such as an radiofrequency (RF) or Bluetooth™ compatible interface, through which a peripheral may be connected. Unlike the MFDs, the peripheral devices are not network enabled, given the cost of the additional hardware and software, and therefore, are inaccessible over a network.

Attempts to make these peripheral devices network accessible require use of costly proprietary hardware and software. Accordingly, there is need in the art for methods and systems to enable a peripheral device, which otherwise lacks intrinsic networking capabilities, to be accessible over a network once attached to an MFD. Additionally, there is a need in the art for a web service architecture which provides network access to peripherals attached to an MFD.

SUMMARY

A system is presented for enabling at least one mass storage device connected to at least one multi-function device to be accessible over a network, the system including at least one processor; and a computer-readable storage medium in communication with the at least one processor, wherein the computer-readable storage medium comprises one or more programming instructions for: receiving a plurality of requests from one or more electronic devices permitted to access the at least one multi-function device and allowing the one or more electronic devices to selectively access and modify electronic information located on the at least one mass storage device connected to the at least one multi-function device and accessible over the network.

A method is presented for enabling at least one mass storage device connected to at least one multi-function device to be accessible over a network, the method including receiving a plurality of requests from one or more servers running local and/or remote client applications; authenticating access capabilities of the one or more servers to the at least one multi-function device; and allowing the one or more servers to selectively access and modify electronic information located on the at least one mass storage device connected to the at least one multi-function device and accessible over the network.

A communications network is presented including a plurality of multi-functional printer machines linked through the communications network; a plurality of storage modules in electrical communication with the plurality of multi-functional printer machines, the plurality of storage modules having electronic information stored therein; and a plurality of external devices requesting access to the plurality of storage modules in electrical communication with the plurality of multi-functional printer machines; wherein the plurality of external devices having authorized access requests are permitted to read, write, and/or delete the electronic information located on the plurality of storage modules and being in electrical communication with the plurality of multi-functional printer machines.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
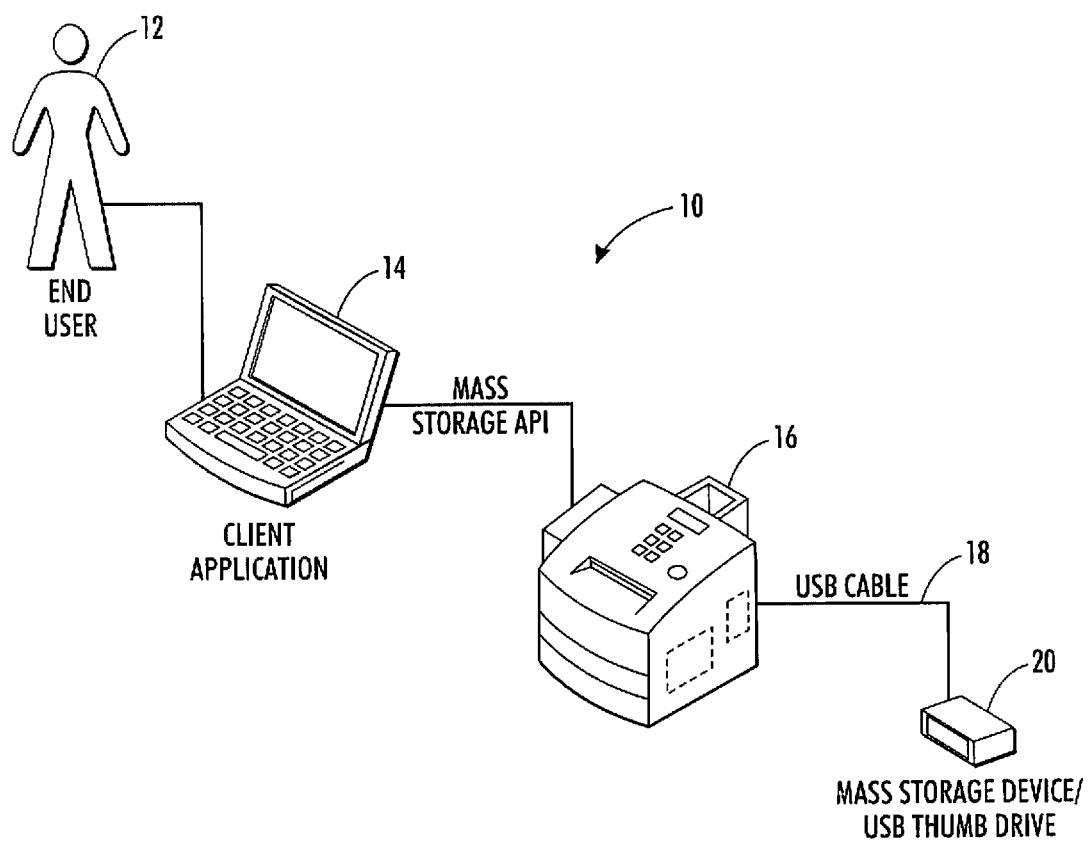
FIG. 1 illustrates a system diagram including a multi-function device in electrical communication with a mass storage device and a client application, in accordance with the present disclosure.

Particular embodiments of the present disclosure are described herein below with reference to the accompanying drawings. In the following description, well-known functions or constructions are not described in detail to avoid obscuring the present disclosure in unnecessary detail.

Various modifications to the preferred embodiment, disclosed herein, will be readily apparent to those of ordinary skill in the art and the disclosure set forth herein may be applicable to other embodiments and applications without departing from the spirit and scope of the present specification and the claims hereto appended. Thus, the present specification is not intended to be limited to the embodiments described, but is to be accorded the broadest scope consistent with the disclosure set forth herein.

The exemplary embodiments of the present disclosure propose developing an off-box Application Programming Interface (API) for allowing third party vendors to make use of a mass storage device attached to an MFD, copier or printer, such that the vendor may at least read and write data to and from the mass storage device.

The exemplary embodiments of the present disclosure further propose a system and method for providing the ability to support mass storage devices on the MFD by detecting when a mass storage device is plugged in via an interface, such as a USB. Once detected, the MFD supports web service based calls for third party applications to detect that a mass storage device is available and allow client applications to at least read, write, and/or delete files from and to the mass storage device. Thus, a presence of the at least one mass storage device is detectable either before or after activation of the at least one multi-function device.

The exemplary embodiments of the present disclosure further propose providing a plurality of functions via an off-box API, such that a remote application running on a server may make use of the mass storage device in the same fashion as a native application running directly on the MFD. The server may receive notification that a mass storage device is available on the MFD, and may then at least read, write, and/or delete information (e.g., electronic files) on that mass storage device. Of course, one skilled in the art may contemplate that the one or more electronic devices or servers are authenticated prior to accessing the electronic information located on the at least one mass storage device. A plurality of different authentication means may be utilized.

The exemplary embodiments of the present disclosure further propose an MFD that supports the ability of a system administrator to configure an IP address or host name of a server along with a port number that may be used for server/client communications. The preconfigured address ensures the security of the data and ensures that such data and communications are sent to a known and expected entity. The mass storage device may be detected at startup, assuming it is currently plugged in, or after the device is already up and running, and a user plugs in a mass storage device. The configured server may query the MFD at any point to inquire as to whether a mass storage device is installed or plugged into the device, along with the mass storage device manufacturer and any other pertinent information required to use the mass storage device.

The exemplary embodiments disclosed herein relate generally to the field of peripheral hardware devices and more specifically to a software architecture, or web service, for enabling network access to peripheral devices, such as mass storage devices, interfaced with one or more MFDs.

The exemplary embodiments of the present disclosure further propose to support the ability to plug in generic mass storage devices to any MFD, thus enabling a system administrator defined server to determine if a mass storage device is detected at start up or if it is plugged into the MFD after it is up and running. The server may obtain files for, for example, printing or other applications so that is may at least read, write, and/or delete files for a plurality of functions and/or purposes.

Prior to describing the present disclosure in further detail, it will first be helpful to define various terms that will be used throughout the following discussion. For example:

The term "print" is overloaded to mean at least sending the document to the printer through any one of a multitude of ways. Moreover, the term "printer" may at least refer to any device that accepts text and graphic output from any type of computing device and transfers the information to any printable medium. A "printer" may refer to any type of xerographic, solid ink, liquid ink, cut sheet or web-based device used to print onto a wide array of printable media. The term "printer" as used herein encompasses at least any apparatus, such as a digital copier, bookmaking machine, facsimile machine, multi-function machine, etc. which performs a print outputting function for any purpose.

The term "multi-function machine" or "MFD" may refer at least to any machine that connects to either a computing device and/or network and performs one or more of the following functions: print, scan, copy, and/or fax. Digital copiers, fax machines, printers, and scanner combinations are all examples of MFDs. The term "MFD" may further refer to at least any hardware that combines several functions in one unit. For instance, an MFD may be a standalone printer or any type of standalone machine/device/apparatus/component. For example, an MFD may be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "MFDs" may refer to any type of electronics suitable for use with a circuit board and intended to be used by a plurality of individuals for a variety of purposes. The terms "multi-function machine" and "MFD" may be used interchangeably throughout the specification.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "storage" may refer to at least data storage. "Data storage" may at least refer to any article or material (e.g., a hard disk) from which information is capable of being reproduced, with or without the aid of any other article or device. "Data storage" may at least refer to the holding of data in an electromagnetic form for access by a computer processor. Primary storage is data in random access memory (RAM) and other "built-in" devices. Secondary storage is data on hard disk, tapes, and other external devices. "Data storage" may also at least refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "application" in the disclosed embodiments refers to a program designed for end users of a computing device, such as a word processing program, a database program, a browser program, a spreadsheet program, a gaming program, and the like. An application is distinct from systems programs, which consist of low-level programs that interact with the computing device at a very basic level, such as an operating system program, a compiler program, a debugger program, programs for managing computer resources, and the like.

The term "processing" may at least refer to determining the elements or essential features or functions or processes of one or more multi-function devices for computational processing. The term "process" may further refer to tracking data and/or collecting data and/or manipulating data and/or examining data and/or updating data on a real-time basis in an automatic manner and/or a selective manner and/or manual manner (continuously, periodically or intermittently).

The term "module" may at least refer to a self-contained component (unit or item) that is used in combination with other components and/or a separate and distinct unit of hardware or software that may be used as a component in a system, such as a printing system including a plurality of multi-function printers and/or MFDs. The term "module" may also at least refer to a self-contained assembly of electronic components and circuitry, such as a stage in a computer that is installed as a unit.

The term "task" refers to a print, scan, copy, and/or fax job or any type of function that may be performed by an MFD. The term "task" may also refer to an execution path through address space, such as a set of program instructions that are loaded in a data storage means. The term "task" may also at least refer to a basic unit of programming that an operating system controls and depending on how the operating system defines a task in its design, this unit of programming may be an entire program or each successive invocation of a program. The term "task" may be used interchangeably with the term "function."

The term "electronic device" may at least refer to one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "electronic device" may at least refer to any type of electronics suitable for use with a circuit board and intended to be used by a plurality of individuals for a variety of purposes.

The term "notification" may refer to a visual or audible indication alerting the user of various status conditions relating to the mass storage devices. "Notification" is the act of notifying someone of something or making a formal announcement. "Notification" may also refer to the warning or announcing of something, usually done in advance.

Embodiments will be described below while referencing the accompanying figures. The accompanying figures are merely examples and are not intended to limit the scope of the present disclosure.

Referring to FIG. 1 a system diagram including a multi-function device in electrical communication with a mass storage device and a client application, in accordance with the present disclosure is presented.

The system diagram 10 depicts an end user 12 having a client application 14 (e.g., a computer) that communicates with a multi-function device 16. The multi-function device 16 is in operable communication with a mass storage device 20 via an interface 18. The system 10 enables the mass storage device 20 to be accessible remotely over a network, such as the Internet. Such network system will be further described with reference to FIG. 2.

Additionally, the client application 14 and the multi-function device 16 may each include at least one processor. The processor may include at least one conventional processor or microprocessor that interprets and executes instructions. The processor may be a general purpose processor or a special purpose integrated circuit, such as an ASIC (application-specific integrated circuit), and may include more than one processor sections.

Moreover, the client application 14 and the multi-function device 16 may each include at least one memory unit or memory module. The memory may be a random access memory (RAM) or another type of dynamic storage device that stores information and instructions for execution by processor. The memory may also include a read-only memory (ROM) which may include a conventional ROM device or another type of static storage device that stores static information and instructions for the processor located within the multi-function device 16. The memory may be any memory device that stores data for use by system 10, for example, a data storage system as defined herein.

Additionally, multifunction device 16 may include input/output devices (I/O devices) that may include one or more conventional input mechanisms that permit a user to input information to the system 10, such as a microphone, touchpad, keypad, keyboard, mouse, pen, stylus, voice recognition device, buttons, etc., and output mechanisms such as one or more conventional mechanisms that output information to the user, including a display, one or more speakers, a storage medium, such as a memory, magnetic or optical disk, disk drive, a printer device, etc., and/or interfaces for the above.

Figure 2:
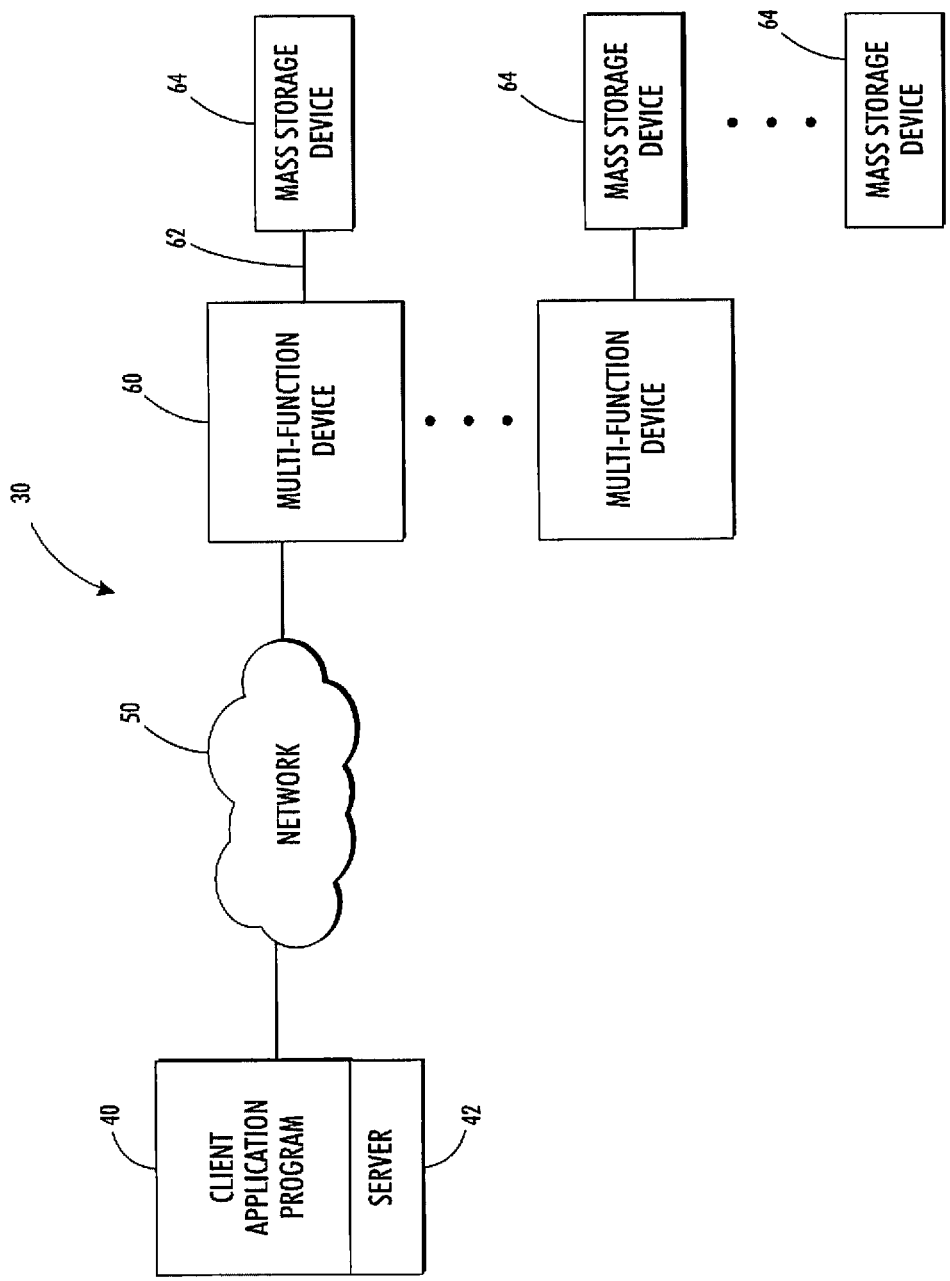
FIG. 2 illustrates a system diagram including a plurality of multi-function devices in electrical communication with a plurality of mass storage devices connected via a network to a remote server having a client application program, in accordance with the present disclosure.

Referring to FIG. 2, a system diagram including a multi-function device in electrical communication with a mass storage device connected via a network to a remote server having a client application program, in accordance with the present disclosure is presented.

The system 30 includes a client application program 40 and a server 42 in electrical communication with a network 50. A plurality of multi-function devices 60 may be in electrical communication with the network 50. The plurality of multi-function devices 60 are connected to a plurality of mass storage devices 64 via interfaces 62. System 30 enables the mass storage devices 64 to be accessible over the network 50 so that the server 42 may access and/or modify electronic information on the plurality of mass storage devices 64. The plurality of multi-function devices 60 implement a mass storage device web service application, located within the plurality of multi-function devices 60 that enable the plurality of mass storage devices 64 to be accessible to a client application program 40 running on the server 42 over the network 50.

Additionally, the server 42 may use a query routine to communicate with the plurality of mass storage devices 64 connected to the plurality of multi-function devices 60. The query routine may be configured to query the plurality of multi-function devices 60 when the user first opens a user interface (not shown) via the client application program 40. This provides the user with instantaneous status information. The query routine may be configured to query the plurality of multi-function devices 60 in accordance with a predetermined period schedule. Whatever information is received in response to the query routine, may be provided to the user interface. This provides the user with dynamic updates directly at the remote location. The query routine may be configured to query the plurality of multi-function devices 60 in response to the status of the plurality of mass storage devices 64. The query routine may be configured such that updating or accessing or modifying of electronic information occurs with minimal user interruption.

Moreover, each of the plurality of multi-function devices 60 may include a user interface (not shown). Such user interface may allow the user of the plurality of multi-function devices 60 to select one or more print attributes to apply to the one or more electronic documents or information selected. The one or more print attributes may include at least one or more of the following: plex, color, quantity, stapling, paper size, margins, watermark, etc. The user may apply these print attributes directly from the plurality of multi-function devices 60 or from the client application program 40 to the electronic documents or information stored on the plurality of mass storage devices 64.

Thus, the user may simply walk to the plurality of multi-function devices 60 or use the client application program 40 of the server 42 to access the desired electronic documents or information directly from the plurality of multi-function devices 60 or directly from the client application program 40. Once the print attributes have been selected and applied to the electronic documents or information selected, the user may print such modified/altered documents (i.e., including the print attributes selected) and store such modified document(s) either to that multi-function device 60 or may send such modified document to a plurality of host devices or electronic devices or store them on the server 42.

In summary, the one or more electronic devices are permitted to select one or more attributes stored on the at least one multi-function device and apply the one or more attributes selected to the electronic information located on the at least one mass storage device. Moreover, once the modified electronic information has the one or more attributes applied thereto, such modified information may be (i) stored on the at least one mass storage device and/or (ii) transmitted back to the one or more electronic devices.

Figure 3:
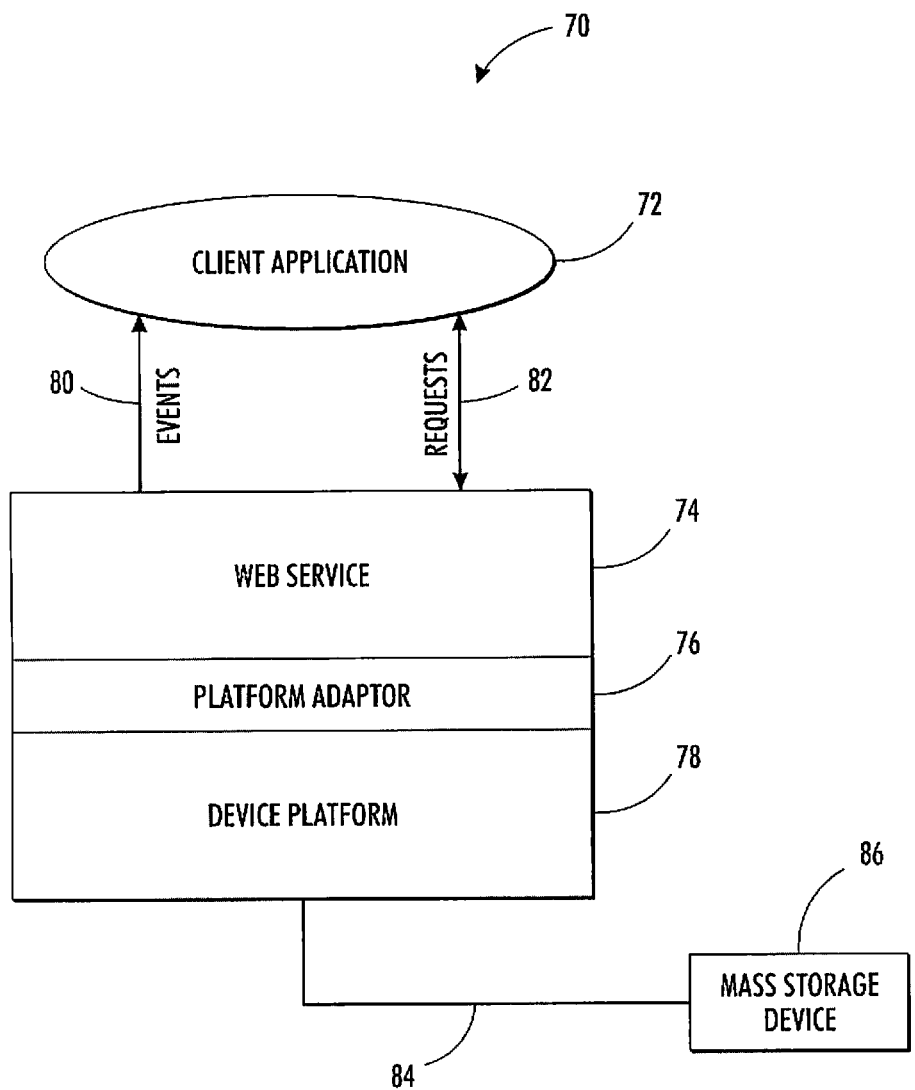
FIG. 3 illustrates a high level diagram of a plurality of mass storage devices connected to a plurality of multi-function devices in a web service architecture, in accordance with the present disclosure.

Referring to FIG. 3, a high level diagram of a plurality of mass storage devices connected to a plurality of multi-function devices in a web service architecture, in accordance with the present disclosure, in accordance with the present disclosure is presented.

In one embodiment, the web service architecture 70 is implemented on one or more MFDs (see FIGS. 1 and 2) in the form of a plurality of application layers 74, 76, 78. At the lowest application level, the application 70 comprises a device platform layer 78 which comprises the operating system and driver framework capable of interacting with the mass storage device 86 attached or connected to the MFD, via an interface 84, on which the application 70 is being executed.

The device platform layer 78 interacts with the mass storage device 86 by, in one embodiment, interfacing through a standard USB hardware interface 84. More specifically, on connecting the mass storage device 86 to the MFD, the device platform layer 78 interfaces with and manages the peripheral device using the necessary peripheral driver which is unique to each type of peripheral. The device platform 78 in turn provides the interface between the platform adaptor layer 76 and the mass storage device 86. It should be appreciated that, in accordance with a standard USB implementation, the MFD comprises, or obtains, a driver for the USB device, loads the driver, and actively interfaces with the USB device in accordance with the driver software.

The platform adaptor layer 76 abstracts the lower level hardware methods, processes, and functions into a higher level of functionality thereby serving to decouple the web service layer 74 from the device platform 78. Thus, the adaptor layer 76 has the ability to abstract peripheral driver functions, which are implemented on each platform differently and are therefore dependent on the underlying platform layer 76, and make those abstracted functions universally available to remote devices via the web service layer 74. In accordance with an aspect of the layered web service architecture 70, these low level functions and configuration continue to be handled by the MFD operating system and driver software at the device platform layer 78, while the high level functions of the mass storage device 86, are exposed to the web service layer 74. This enables the web service layer 74 to be portable and uncoupled from the underlying device platform 78.

The web service layer 74 comprises a plurality of Application Programming Interfaces (APIs) that may be accessed over a network (see FIG. 2), such as the Internet, and executed on the MFD hosting the requested services. In one embodiment, the web service layer 74 comprises web APIs that enable an application program residing on a remote server to make web service based calls to the peripheral device attached to the MFD. In another embodiment, the application program residing on a remote server receives web service based calls from the MFD in accordance with user-based interactions with the attached mass storage device 86. The web based calls/communication happen over the Hypertext Transfer Protocol (HTTP) protocol using Extensible Markup Language (XML) messages that follow the Simple Object Access Protocol (SOAP) standard and updates, future versions, or derivations thereof. In one embodiment, a Web Service Description Language (WSDL) is used to describe at least one web service and the methodology of accessing the web service and generate the appropriate functions for handling SOAP messaging.

The web service layer 74 APIs provide an interface to an application program 72, which desires to transmit data and/or commands and/or receive data and/or commands from the mass storage device 86, thereby making use of the functionality of the mass storage device 86 as if it was independently network accessible. In one embodiment, the client application program 72 resides on a remote server interfacing with the web service layer 74 over a network. In alternate embodiments, the client application program 72 resides locally on the MFD that hosts the hardware peripherals web service software architecture 70.

The client application program 72 sends requests to and receives responses 82 from the web service layer 74. To service the requests and provide the responses 82, the web service layer 74 uses the abstracted functionality exposed and made available by the platform adaptor layer 76. Through the abstracted functionality, the web service layer 74 may submit the requests and receive the responses 82 via the device platform 78. Similarly, events 80 pertaining to the mass storage device 86 may be communicated to the web service layer 74 by the underlying layers 76, 78. The web service layer 74 then communicates these events 80 to the client application program 70.

Figure 4:
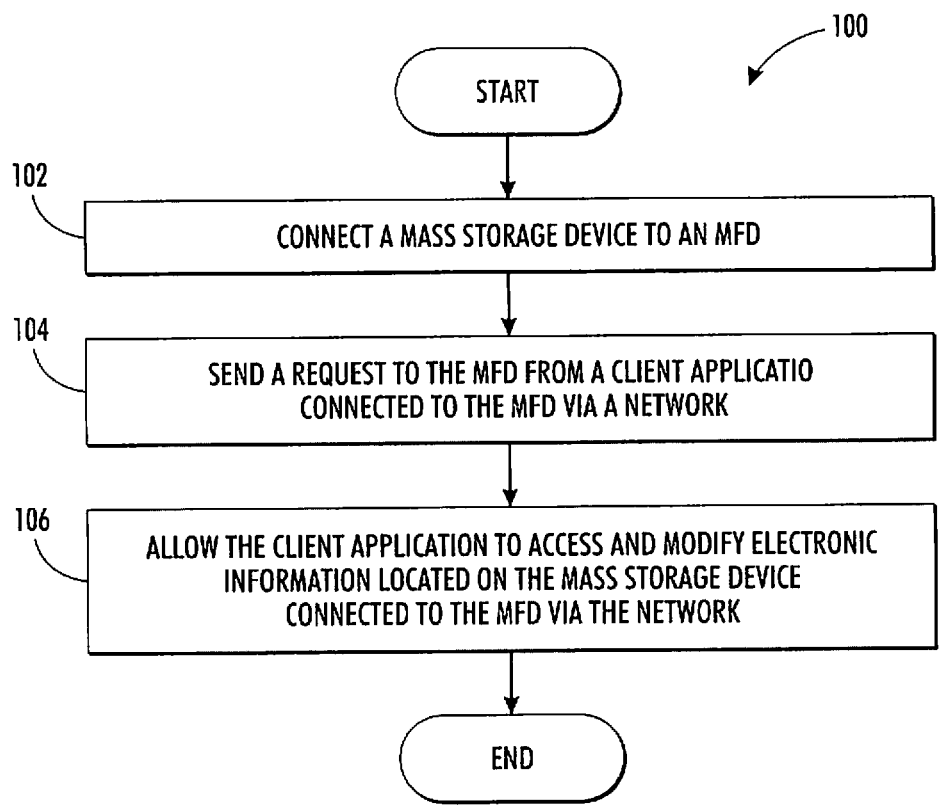
FIG. 4 illustrates a flowchart depicting a method for enabling at least one mass storage device connected to at least one multi-function device to be accessible over a network, in accordance with the present disclosure.

Referring to FIG. 4, a flowchart depicting a method for enabling at least one mass storage device connected to at least one multi-function device to be accessible over a network, in accordance with the present disclosure is presented.

The flowchart 100 includes the following steps. In step 102, the mass storage device is connected to an MFD. In step 104, a request is sent to the MFD from a client application connected to the MFD via a network. In step 106, the client application is permitted access and permitted to modify electronic information (i.e., files, documents, etc.) located on the mass storage device connected to the MFD via the network. The process then ends for the first cycle or first iteration. However, the process may be a continuous iterative process. In other words, the steps of the process may repeat for a number of cycles or iterations, where at least the accessing, authenticating, and modifying steps are constantly and continuously repeated.

In an alternative embodiment, the electronic information located on the at least one mass storage device is divided into categories, one or more of the categories being accessible by different authorized clients operating the one or more electronic devices. In other words, different servers or electronic devices may be permitted access only to specific areas of the mass storage devices.

Advantages of the present disclosure include at least the following: (i) the ability of customers to use mass storage devices for their specific applications, (ii) elimination of customer-specific add-on boxes currently being used to support printing from a mass storage device, (iii) reducing the need to embed customer-specific codes on the MFDs for customer-specific mass storage applications, (iv) presenting an API that is generic enough to support most, if not all, mass storage devices for any desired purpose, (v) allowing printing files from mass storage devices without any modifications to the MFD software, and (vi) the ability to add custom watermarks to electronic documents or information, and store such modified electronic documents or information on the mass storage device or in any remote location (e.g., servers).

Additionally, another advantage of the present disclosure includes allowing the writing of files to mass storage devices without any modifications to the MFD software. For example, a third party application on an external server may scan files on the MFD by using a web-service API and then write them to the mass storage device.

As a result, the ability to abstract core peripheral device functionality and make such functionality universally available to third party applications eliminates the need to upgrade, update, or modify remote client applications every time the MFD or peripheral device, such as a mass storage device, has been updated, upgraded, or otherwise modified. Therefore, remote client applications remain compatible with peripherals as they change. Moreover, by abstracting higher level peripheral functionality, the complexity of the raw hardware interface, or the lowest hardware configuration level, continues to be handled by dedicated drivers and is not managed or otherwise addressed by the web service interface, thereby making the interfacing process generally, and each web service in particular, scalable, simple, extensible, portable, and platform independent.

Embodiments as disclosed herein may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Additionally, "code" as used herein, or "program" as used herein, is any plurality of binary values or any executable, interpreted or compiled code which may be used by a computer or execution device to perform a task. This code or program may be written in any one of several known computer languages. A "computer," as used herein, may mean any device which stores, processes, routes, manipulates, or performs like operation on data. A "computer" may be incorporated within one or more MFDs or servers or electronic devices to operate one or more processors to run the MFD network system.

The language translation software program may be packaged and distributed as a software package for downloading to the multifunctional printer device where the set of programmable instructions are stored within at least one computer-readable medium, such as a CD-ROM, diskette, etc. The language translation software program may also be downloaded to the multifunctional printer device through a network connection connecting the multifunctional printer device to a remote computer station, such as a remote server.

A service provider may be any entity that develops, offers, controls, manages, owns, alters and/or sells software and/or hardware products. A service provider may be any entity that performs one or more tasks on one or more pre-existing MFDs, which may or may not be controlled or owned by the service provider. For example, the entity may offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) may offer any type of service and/or product to optimize pre-existing, pre-owned MFDs by referring potential customers to an Internet website or a store that may or may not be associated with printing-related services and/or products. The term "entity" may refer to anything that may exist as a discrete and/or distinct unit that owns, operates, manages, and/or controls one or more of a plurality of machines or electronic devices (such as MFDs). For example, the term "entity" may include the term "company."

Further, although aspects of the present disclosure have been described herein in the context of several particular implementations in particular environments for particular purposes, those of ordinary skill in the art will recognize that its usefulness is not limited thereto and that the present disclosure may be beneficially implemented in any number of environments for any number of purposes. For example, though the disclosure has been described in terms of a security system, all its functionality would be useful in any situation where immediate contact with a third party is required.

It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for enabling at least one mass storage device connected to at least one multi-function device to be remotely accessible over a network, the system comprising:
the at least one multi-function device further comprising a machine that can connect to a computing device and a network and is capable of at least one of printing, scanning, copying, and faxing;
at least one processor; and
a computer-readable storage medium in communication with the at least one processor, wherein the computer-readable storage medium comprises one or more programming instructions for:
implementing a web service architecture on said at least one multi-function device comprising a device platform layer, a platform adaptor layer, and a web service layer;
receiving a plurality of requests at the at least one multi-function device related to said mass storage device from one or more electronic devices wherein a presence of the at least one mass storage device is detectable before activation of the at least one multi-function device, comprising one or more computers via the implemented web service architecture;
permitting the one or more electronic devices to access the at least one multi-function device via the implemented web service architecture; and
allowing the one or more electronic devices to remotely and selectively access and modify electronic information located on the at least one mass storage device connected to the at least one multi-function device and accessible over the network via the implemented web service architecture.

2. The system according to claim 1, wherein the at least one mass storage device is at least one of: a Universal Serial Bus (USB) thumb drive, an external hard drive, an external optical drive, and flash memory cards.

3. The system according to claim 1, wherein the one or more electronic devices are permitted to remotely read, write, and/or delete data to and from the at least one mass storage device.

4. The system according to claim 3, wherein the one or more electronic devices are servers wherein a mass storage device web service application associated with said multi-function device enables said servers to run local and/or remote client applications.

5. The system according to claim 1, wherein the one or more electronic devices are permitted to select one or more attributes stored on the at least one multi-function device and apply the one or more attributes selected to the electronic information located on the at least one mass storage device.

6. The system according to claim 5, wherein modified electronic information having the one or more attributes applied thereto are (i) stored on the at least one mass storage device and/or (ii) transmitted back to the one or more electronic devices.

7. The system according to claim 1, wherein the access to the electronic information is enabled via a communication protocol, such as a Simple Object Access Protocol (SOAP).

8. The system according to claim 1, wherein the one or more electronic devices are authenticated prior to accessing the electronic information located on the at least one mass storage device.

9. The system according to claim 1, wherein the electronic information located on the at least one mass storage device is divided into categories, one or more of the categories being accessible by different authorized clients operating the one or more electronic devices.

10. The system according to claim 1, wherein the one or more electronic devices are permitted to query the at least one multi-function device regarding availability of mass storage devices.

11. A method for enabling at least one mass storage device connected to at least one multi-function device to be remotely accessible over a network, the method comprising:
configuring the at least one multi-function device as a machine that can connect to a computing device and a network and is capable of at least one of printing, scanning, copying, and faxing;
implementing a web service architecture on said at least one multi-function device comprising a device platform layer, a platform adaptor layer, and a web service layer;
receiving a plurality of requests related to said mass storage device from one or more servers running local and/or remote client applications via the implemented web service architecture wherein a presence of the at least one mass storage device is detectable before activation of the at least one multi-function device;
authenticating access capabilities of the one or more servers to the at least one multi-function device via the implemented web service architecture; and
allowing the one or more servers to remotely and selectively access and modify electronic information located on the at least one mass storage device connected to the at least one multi-function device and accessible over the network via the implemented web service architecture.

12. The method according to claim 11, further comprising permitting the one or more servers remotely to read, write, and/or delete data to and from the at least one mass storage device.

13. The method according to claim 11, further comprising permitting the one or more servers to select one or more attributes stored on the at least one multi-function device and apply the one or more attributes selected to the electronic information located on the at least one mass storage device.

14. The method according to claim 13, wherein modified electronic information having the one or more attributes applied thereto are (i) stored on the at least one mass storage device and/or (ii) transmitted back to the one or more servers.

15. The method according to claim 11, further comprising enabling access to the electronic information via a communication protocol, such as a Simple Object Access Protocol (SOAP).

16. The method according to claim 11, further comprising dividing the electronic information into categories, one or more of the categories being accessible by different authorized clients operating the one or more servers.

17. The method according to claim 11, further comprising permitting the one or more servers to query the at least one multi-function device regarding availability of mass storage devices.

18. A communications network comprising:
a plurality of multi-functional printer machines comprising a machine that can connect to a computing device and a network and is capable of at least one of printing, scanning, copying, and faxing, linked through the communications network;
a plurality of storage modules in electrical communication with the plurality of multi-functional printer machines wherein a presence of the plurality of storage modules is detectable before activation of the at least one multifunctional printer machine, the plurality of storage modules having electronic information stored therein comprising a web service architecture comprising a device platform layer, a platform adaptor layer, and a web service layer; and a plurality of external devices requesting access to the plurality of storage modules in electrical communication with the plurality of multi-functional printer machines via the web service architecture;

wherein the plurality of external devices having authorized access requests are permitted to read, write, and/or delete the electronic information located on the plurality of storage modules and being in electrical communication with the plurality of multi-functional printer machines via the web service architecture.

* * * * *